(12) United States Patent
Ali (10) Patent No.: US 11,651,241 B2
(45) Date of Patent: May 16, 2023

(54) SYSTEM AND METHOD FOR SPECIFYING RULES FOR OPERATIONAL SYSTEMS

(71) Applicant: MASTERCARD INTERNATIONAL INCORPORATED, Purchase, NY (US)

(72) Inventor: Muhammad Yaseen Ali, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 896 days.

(21) Appl. No.: 16/156,488

(22) Filed: Oct. 10, 2018

(65) Prior Publication Data

US 2019/0122127 A1 Apr. 25, 2019

(30) Foreign Application Priority Data

Oct. 23, 2017 (EP) ..................................... 17197864

(51) Int. Cl.
*G06N 5/02* (2006.01)
*G06F 16/901* (2019.01)
(Continued)

(52) U.S. Cl.
CPC ............. *G06N 5/025* (2013.01); *G05B 15/02* (2013.01); *G06F 16/9017* (2019.01);
(Continued)

(58) Field of Classification Search
CPC ... G06N 5/025; G06F 40/205; G06F 16/9017; G06F 16/90335; G05B 15/02;
(Continued)

(56) References Cited

U.S. PATENT DOCUMENTS 6,427,146 B1 * 7/2002 Chu ..................... G06F 16/2358
707/694
7,249,177 B1 * 7/2007 Miller ................. H04L 63/0861
726/28

(Continued)

OTHER PUBLICATIONS

Mapping high-level business rules to and through aspects Cibrán et al. (Year: 2005).*

(Continued)

*Primary Examiner* — Kakali Chaki
*Assistant Examiner* — Ababacar Seck
(74) *Attorney, Agent, or Firm* — Barta, Jones & Foley, PLLC (57) ABSTRACT

A method of controlling an operational system by a rules management system comprising a processor and a memory, and a computing apparatus comprising a processor and a memory are provided. The processor is programmed to execute rules from a rules repository stored on a memory in response to a request. The computing apparatus further comprises a high rules repository storing one or more high level rules, wherein each high level rule, when executed by the processor, modifies the effect of execution of one or more rules $R_m$ in the rules repository; and a high rules conditions module that when executed by the processor identifies and executes the high level rules that apply to the request.

20 Claims, 7 Drawing Sheets

(51) Int. Cl.
    *G06F 16/903*     (2019.01)
    *G05B 15/02*     (2006.01)
    *G06Q 30/02*     (2012.01)
    *G06F 40/205*     (2020.01)
    *G06N 5/025*     (2023.01)
    *G06Q 30/0207*     (2023.01)
    *G06Q 30/0241*     (2023.01)

(52) U.S. Cl.
    CPC ...... *G06F 16/90335* (2019.01); *G06F 40/205* (2020.01); *G06Q 30/0207* (2013.01); *G06Q 30/0241* (2013.01)

(58) Field of Classification Search
    CPC ..... G05B 2219/25011; G06Q 30/0207; G06Q 30/0241
    See application file for complete search history.

(56) References Cited

U.S. PATENT DOCUMENTS

| | | | | |
|---|---|---|---|---|
| 7,953,670 | B2* | 5/2011 | Colella | G06Q 10/06 705/64 |
| 8,141,075 | B1* | 3/2012 | Chawla | G06F 9/45558 718/1 |
| 11,080,954 | B1* | 8/2021 | Rogers | G07C 9/38 |
| 2004/0193399 | A1* | 9/2004 | Potter | G06F 40/232 704/4 |
| 2007/0003914 | A1* | 1/2007 | Yang | G06F 9/453 434/236 |
| 2008/0034401 | A1* | 2/2008 | Wang | H04L 63/20 726/1 |
| 2008/0275829 | A1* | 11/2008 | Stull | H04L 9/00 706/17 |
| 2009/0271840 | A1* | 10/2009 | Gillet | G06F 21/6209 726/17 |
| 2010/0030604 | A1* | 2/2010 | Cummins | G06Q 10/0633 705/7.27 |
| 2011/0163843 | A1* | 7/2011 | Vallone | G07F 5/26 340/5.2 |
| 2012/0102543 | A1* | 4/2012 | Kohli | H04L 63/20 726/1 |
| 2012/0166459 | A1* | 6/2012 | Ritter | G06F 16/258 707/756 |
| 2012/0239680 | A1* | 9/2012 | Gudla | G06Q 90/00 707/769 |
| 2012/0254090 | A1* | 10/2012 | Burris | G06N 5/027 706/47 |
| 2013/0031044 | A1* | 1/2013 | Miranda | G06N 5/025 706/47 |
| 2014/0101063 | A1* | 4/2014 | Paul | G06Q 30/0185 705/318 |
| 2014/0143782 | A1* | 5/2014 | Shekar | G06Q 10/06 718/100 |
| 2015/0081552 | A1* | 3/2015 | Stewart | G06Q 20/3226 705/44 |
| 2015/0106888 | A1* | 4/2015 | Cheng | G06F 21/45 726/5 |
| 2015/0317851 | A1* | 11/2015 | Linnartz | G06F 21/34 340/5.53 |
| 2016/0283703 | A1* | 9/2016 | Allyn | H04L 63/0861 |
| 2016/0300050 | A1* | 10/2016 | Hecht | H04W 12/06 |
| 2017/0017531 | A1* | 1/2017 | Choi | G06F 9/542 |
| 2017/0069003 | A1 | 3/2017 | Barta et al. | |
| 2018/0089916 | A1* | 3/2018 | Drako | G07C 9/00571 |
| 2018/0197086 | A1* | 7/2018 | Schroeder | G06N 5/025 |
| 2018/0223565 | A1* | 8/2018 | Carr | G06Q 20/18 |
| 2020/0349786 | A1* | 11/2020 | Ho | G06V 40/172 |

OTHER PUBLICATIONS

Cibran, Maria Agustina, "Mapping High-Level Business Rules To and Through Aspects", JFPDLA, vol. x—n° x/x, copyright 2005, 20 pages.

Roux-Desselas, D., "International Search Report and Written Opinion of the International Searching Authority," International application No. PCT/US2018/053305, dated Jan. 22, 2019, 14 pages.

Roux-Desselas, D., "Communication", EP Application No. 17 197 864.6, dated Mar. 27, 2018, 10 pages.

Roux-Decker, D., "Coomunication", EP Application No. 17 197 864.6, dated Mar. 26, 2020, 7 pages.

Roux-Decker, D., "Communication pursuant to Article 94(3) EPC", EP Application No. 17 197 864.6, dated Nov. 16, 2021, 6 pages.

* cited by examiner

SYSTEM AND METHOD FOR SPECIFYING RULES FOR OPERATIONAL SYSTEMS

CROSS REFERENCE TO RELATED APPLICATION

This application claims priority to European Patent Application No. 17197864.6, filed Oct. 23, 2017, entitled "SYSTEM AND METHOD FOR SPECIFYING RULES FOR OPERATIONAL SYSTEMS", the entirety of which is incorporated herein by reference.

FIELD OF INVENTION

The present invention relates to the management and execution of rules for operational systems. In specific aspects, it relates to methods and systems for modifying the outcome of multiple rules.

BACKGROUND

A rule management system is a platform used to define, deploy, execute, monitor and maintain a variable and complex decision logic used by operational systems. The rule management system allows the logic (also referred to as rules) to be extracted and managed separately from other parts of the operational system, allowing a user of the rule management system to specify new rules without the need to modify each part of the system on which the new rule may have an effect.

Rule management systems may be used in a variety of contexts, and are particularly advantageous where the requirements of an operational system are subject to a high degree or frequency of change, where the decision used by the system is very complex, for example because it involves a large number of complex and interrelated requirements, or where consistency and traceability of actions or decisions made need to be guaranteed across the operational system.

For example, rules and rules management system may be used in an access control system in an office facility, to manage multiple requirements of the system including who can open which door, when is each door/category of door locked, which identification is required before opening a door, etc. Using rules to define, modify and execute such requirements means that a facilities manager can easily define very granular requirements (e.g. where different areas of the facility are occupied by different tenants, have different operational requirements, etc.) as well as concurrently manage general requirements, without having to alter the core applications present e.g. at each door or in each office suite.

However, when a user of the rules management system wishes to implement a change that relates to multiple existing rules, there is a significant overhead involved in identifying, modifying and testing each of the relevant existing rules to implement the change.

SUMMARY

In accordance with a first aspect, the invention provides a method of controlling an operational system by a rules management system comprising a processor programmed to execute rules from a rules repository stored on a memory. The method comprises providing one or more high level rules comprising a condition part and an effect part, wherein each high level rule, when executed, modifies the effect of one or more rules $R_m$ in the rules repository; identifying the rules $R_m$ that match the condition part of the high rule; and receiving a request relating to one or more rules and checking whether the one or more high level rules apply to the request; executing each rule $R_m$ and/or each high level rule that applies to the request.

In embodiments, the effect part of the high level rule is qualified as an "add" effect, and the high level rule modifies the effect of one or more rules $R_m$ by combining the effect of the rule with that of the high rule. In some embodiments, executing the rules that apply to the request comprises executing each $R_m$ and each high level rule.

In embodiments, the effect part of the high level rule is qualified as a "replace" effect, and a high level rule modifies the effect of one or more rules $R_m$ by replacing the effect of each rule $R_m$ with that of the high rule. In some embodiments, executing the rules that apply to the request comprises executing the high level rule only for each $R_m$ identified.

Providing one or more high level rules may comprise a user defining high level rules at a rule management interface. In embodiments, defining high level rules comprises defining whether the action of the high level rule is to replace or be combined with the actions of the rules $R_m$. In embodiments, defining the high level rules comprises defining one or more criteria to identify the rules $R_m$ to modify.

The method may further comprise verifying the one or more high level rules provides do not overlap or conflict with existing high level rules.

In embodiments, the method further comprises recording a pointer to each rule $R_m$ that matches the condition part of each high rule, and recording whether the effect part of the high level rule is qualified as an "add" effect or a "replace" effect.

In accordance with a second aspect, the invention provides a computing apparatus comprising a processor and a memory, wherein the processor is programmed to execute rules from a rules repository stored on a memory in response to a request. The computing apparatus further comprises a high rules repository storing one or more high level rules, wherein each high level rule, when executed by the processor, modifies the effect of execution of one or more rules $R_m$ in the rules repository; and a high rules conditions module that when executed by the processor identifies and executes the high level rules that apply to the request.

In embodiments, the computing apparatus further comprises a rule management interface configured to allow a user to specify new high rules.

In embodiments, the computing apparatus comprises a high rules parser that when executed by the processor: separates a high rule into an action part and a condition part; and sends the action part to the high rules repository and the condition part together with a pointer to the action part to the high rules condition module.

The computing apparatus may further comprise a sanity check module that when executed by the processor determines whether a new high rule satisfies one or more defined criteria by comparing the new high rule to existing high rules and rules in the rules repository. In embodiments, the sanity check module when executed by the processor prevents deployment of a new high rule that does not satisfy one or more of the defined criteria.

Using the invention, it is possible to simply and efficiently modify the effect of multiple rules in an operational system with a minimum overhead in identifying, modifying and testing each of the relevant existing rules to implement the change.

BRIEF DESCRIPTION OF DRAWINGS

Embodiments of the invention will now be described, by way of example only, with reference to the accompanying drawings, in which.

DETAILED DESCRIPTION

A rule (also referred to as 'business rule' because they are frequently used to formalise aspects of the functioning of a business) is a statement that defines or constraints some aspect of the operational system to which it relates. Rules are atomic in the sense that they cannot be broken down or decomposed further into more detailed rules. Rules are expressed in one or more formal rule statements. Formal rule statements are simply expressions of rules in the convention of a particular formal grammar (also referred to as 'formal expression type'). Formal expression types include structured English, IDEF1X, Oracle's CASE*Method, Object Role Modelling, Ross's notation, etc. Formal rule statements are also referred to herein as 'rules' for readability, and the skilled person would be able to interpret the term according to the context. Note, however, that in essence rules are sections of software which, when run on a suitable software platform, such as a rules engine, are responsive to an event or condition, determine a decision, and action or execute an outcome. This will become apparent in the discussion that now follows.

For example, a rule for an access control system may specify the requirement that the system does not allow a door to be opened even with appropriate identification on Sundays because security must be contacted before the door can be opened. A structured English example of a formal rule statement corresponding to this rule is:

IF open-door-request.day=Sunday THEN
a. Halt ID-authorisation
b. Call Security
ENDIF As another example, a rule for an online ordering portal for a food vendor may specify the requirement that the system does not allow a user of the online ordering portal to order food via the portal on Sunday because the shop is closed. A structured English example of a formal rule statement corresponding to this rule is:

IF order.day=Sunday THEN
a. Halt order
b. Display message("The shop is closed on Sundays")
ENDIF There are three main types of rules: structural assertions, action assertions, and derivations. Structural assertions are terms (defined concepts) or statements of fact that express some aspect of the structure of an operational system, including facts assembled from terms. Action assertions are statement of a constraint or condition that limits or controls the actions of an operational system (e.g. IF this THEN do that). Derivations are statements of knowledge derived from other knowledge in the operational system. This disclosure is primarily concerned with rules that are action assertions, i.e. rules as exemplified above, that define what the behaviour of the operational system (or parts thereof) should be in a given context, in response to a given challenge, etc.

A user of the rules management system can simply specify rules to represent constraints that should be applied to an operational system, via a rule management system. The rule management system can then deploy the rule dynamically, without needing to take any of the systems that it responds to offline/out of service, because no change to the structure of any of the core applications of the operational system is required. In the example of the food vendor above, the user of the rules management system can simply use the system to set opening hours and behaviours dynamically and define the required behaviour of any external applications (for example the online ordering portal, the security system of the physical shop, the answering machine of the phone line of the shop, etc.) without having to modify the code of the core applications controlling each of these functions.

Figure 1:
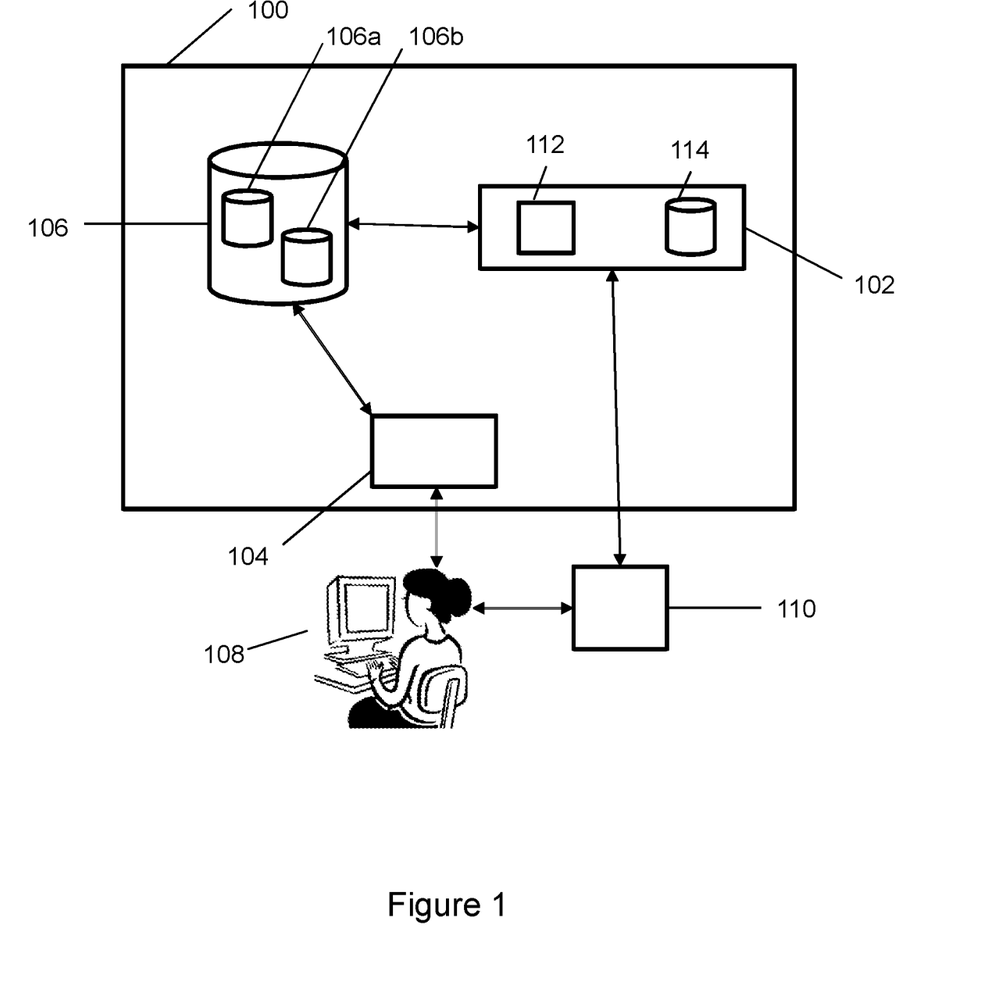
FIG. 1 illustrates schematically a rule management system according to the prior art.

FIG. 1 illustrates schematically a simple rule management system 100. The system comprises a rules engine 102, a rule management interface 104, and a data storage 106. The rule management interface 104 is used by a user of the system 108 to write, modify and manage rules. The rule management interface 104 is a programme that, when executed by a processor on a computing device, allows a user to write, modify and manage rules. The computing device hosting the rule management interface 104 typically comprises in addition to a processor, a memory storing the programme, and an input/output system to allow interaction with the user. As the skilled person would understand, the computing device hosting the rule management interface 104 may be a user computing device or may be provided by a server and accessed by the user 108 via a user computing device. The data storage 106 comprises a rules repository 106a and optionally one of more additional data stores 106b. The optional data stores 106b may be provided outside of the rule management system, or may be omitted entirely. The optional data stores 106b may comprise databases that store information regarding requests that have been submitted, rules that have been executed, results that have been obtained, information that may be used to interpret a request, etc. The rules engine 102 executes requests from an end user 108 or an external application 110, using data from the data storage 106, and returns the result of execution of rules to one or more external applications 110 and/or end users 108 (for example, when external application 110 comprises a user interface). The end user 108 may be the same person as the user of the system (as illustrated on FIG. 1), or may be a different person, submitting requests to the rule management system that has been previously set up by the user of the rule management system. As the person skilled in the art would understand, requests may be submitted by a (physical) user and/or may be generated by other applications, devices, etc., that communicate with the rule management system in order to obtain a decision, for example on which action should be performed in a given situation. In particular, the rules engine 102 comprises a processor 112 and a memory 114, storing algorithms that, when run by the processor, allow the rules engine 102 to identify the rules stored in the rules repository 106a that are applicable to a request, define an order in which the rules should be executed, and execute the rules. In embodiments, the rule management interface may be executed by the same processor 112 and may optionally be stored on the same memory 114 as the rules engine 102.

According to the invention, there is provided a new type of rules, referred to herein as 'high level rules' or 'high rules' (HR), and an associated language and architecture. High rules allow a user to change the output of multiple rules at a global level, without having to modify, deploy and test each rule that may be impacted by the change. This results in a significant time saving, and reduces the number of operations needed to implement a change, thereby reducing the potential for errors.

Figure 2:
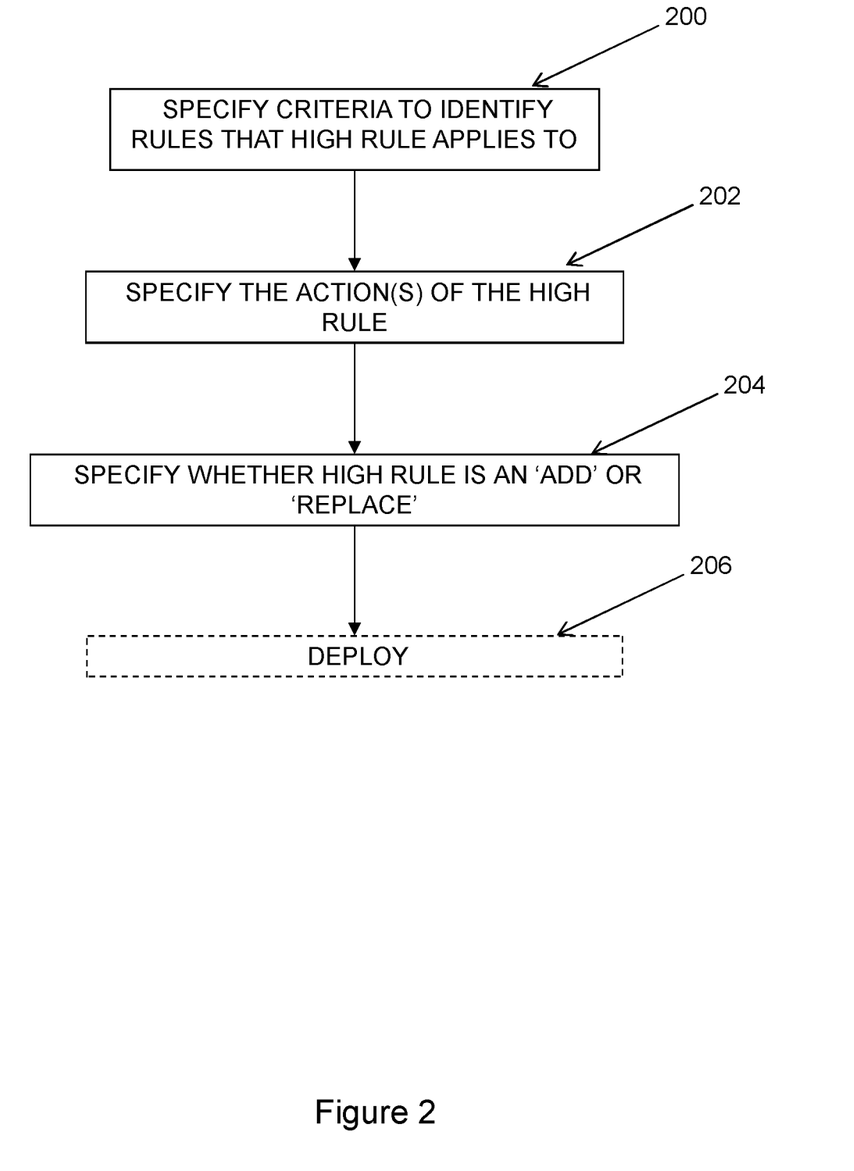
FIG. 2 illustrates a method of specifying high level rules according to an embodiment of the invention, as a flow diagram.

FIG. 2 is a flowchart illustrating a method of specifying high level rules according to an embodiment of the invention. At step 200 a user of the rules management system can specify one or more criteria that indicate which rules should have a different output following the change. In embodiments, the user may specify criteria that indirectly indicate which rules should have a different output following the change, for example by specifying one or more criteria on the content of a request, wherein requests satisfying the criteria may satisfy the condition statement of multiple rules. For example, a user may be able to specify the criteria that the request mentions an open door request. This may correspond to indicating a series of rules where the condition statement contains "IF open-door-request". In embodiments, a user of the rules management system may want to modify the output of rules where the condition matches or contains a given element. The user then specifies 202 which command(s) (action(s)) should be executed when rules that satisfy the one or more criteria are executed. The user may then specify 204 whether the command should replace the existing action part of the rules concerned, or be executed in addition, i.e. whether the high rule is a "replace" or an "add" rule. In embodiments, the system may have a default option for this setting (e.g. "replace" or "add") and the user may omit step 204. At step 206 the rule is then deployed in the rule management system (see below). Therefore, the high level rule can be considered to comprise a 'condition' part which serves to identify or 'match' which lower level rules will be affected by the execution of the high level rule, and an 'effect' or 'action' part which defines the change in the rule action that the high level rule is to carry out.

In the example above, a user of the rule management system for an access control system may want to change the behaviour of the access control system on Saturdays, to specify that security should also be called on Saturday. The user will therefore specify at step 200 that rules including "day=Saturday" in the condition part should be modified, at step 202 that the action to include is "Call Security", and at step 204 that this action is to be executed in addition to what is normally done on Saturday. The user may instead or in addition want to change the "Call Security" behaviour, regardless of the day and which condition triggered this action, because they no longer have security and instead have installed a keypad with a code on each door. The user can therefore specify at step 200 that rules including "Call Security" in the action part should be modified, at step 202 that the action to include is "Request access-code", and at step 204 that the action is to replace "Call Security".

Figure 3:
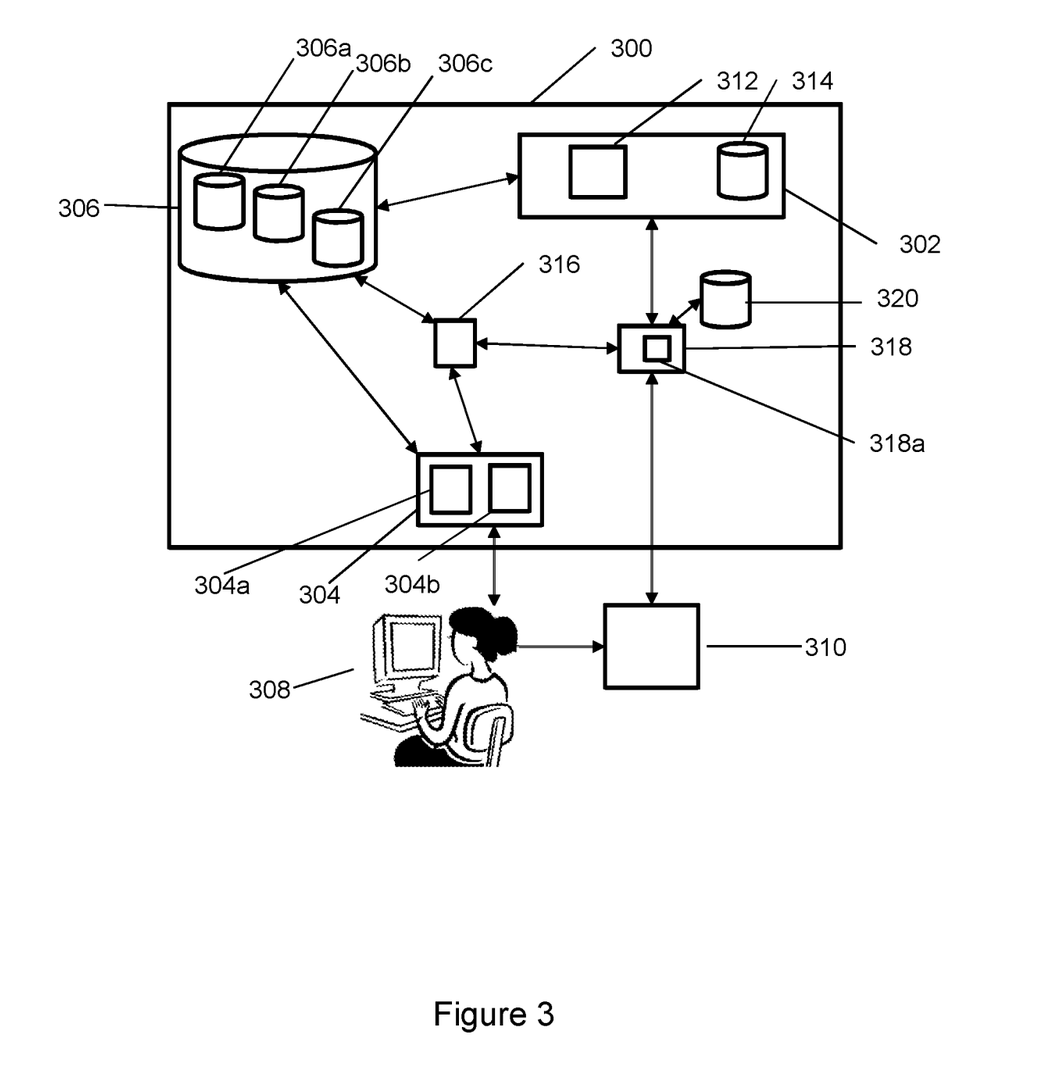
FIG. 3 illustrates schematically a rule management system according to an embodiment of the invention.

The deployment and execution phases in a rule management system including high rules will now be explained in more detail. FIG. 3 illustrates schematically a rule management system 300 according to an embodiment of the invention. The system described is a convenient embodiment implementing the high rules of the invention with a low level of modification required from a conventional rules management system. However, the skilled person would understand that different implementations are possible, and in particular that functions indicated as performed by some entities may in fact be performed by other entities, such as existing entities of a rules management system.

The system comprises a rules engine 302, a rule management interface 304, and a data storage 306. As is the case in the embodiment of FIG. 1, the rule management interface 304 is an algorithm executed by a processor and that enables a user 308 of the rules management system to write, modify, and manage rules. However, the rule management interface 304 comprises a rules module 304a and a high rules module 304b, allowing the user to write, modify and manage rules and high rules, respectively. The rules engine 302 is similar to the rules engine 102 above and performs a similar function. In particular, the rules engine also comprises a processor 312 and a memory 314, storing algorithms that, when run by the processor, allow the rules engine to identify the rules that are applicable to a request, define an order in which the rules should be executed, and execute the rules. The processor 312 and memory 314 may also execute and store the rule management interface 204 algorithm, or these may be functions may be provided by a separate processor and/or memory of a server or user computing device. The data storage 306 comprises a rules repository 306a, a high rules repository 306c and optionally one of more additional data stores 306b. The rules repository 306a and optional data stores 306b are similar in structure and function to those above.

Figure 4:
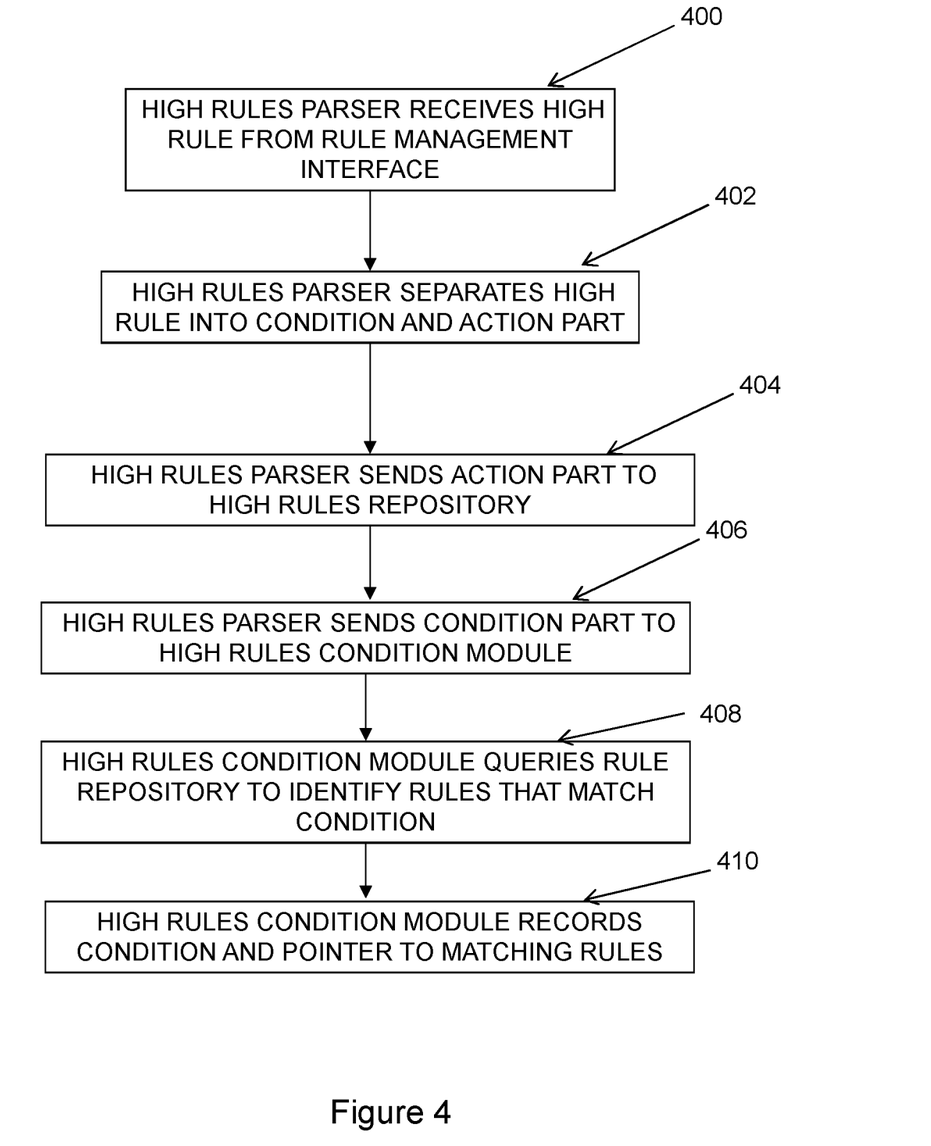
FIG. 4 illustrates a method of deploying high level rules according to an embodiment of the invention, as a flow diagram.

The system additionally comprises a high rules parser 316. The high rule parser 316 is an algorithm stored on a memory and executed by a processor. The memory and/or processor may be the same as processor 312 and memory 314, or may be provided separately. In the deployment phase illustrated in the flowchart of FIG. 4 (i.e. after a user of the rules management system has specified one or more new high rules, for example as explained in relation to FIG. 2, using the high rule module 304b of the rule management interface 304), the high rules parser 316 receives 400 a high rule from the rule management interface 304 and separates 402 it into its condition and its action part. The high rules parser 316 sends 404 the action part to be stored in the data storage 306, in particular in the high rules repository 306c. As the skilled person would understand, the rules and high rules repository need not be separate storages and may instead be a single data repository. In these embodiments, the action part of high rules may be stored in a similar way as normal rules but without requiring a condition part. The high rules parser 316 then sends 406 the condition part to the high rules condition module 318, which queries 408 the rules repository 306a to identify the rules in the rules repository 306a that match the criteria specified by the user for the high rule (see step 200 above). The high rules conditions module 318 then records 410 a pointer to each of the matching rules together with the condition part of the high rule. The high rules conditions module 318 records a pointer to the corresponding action part in the high rules repository 306b, and the information as to whether the high rule is an "add" or a "replace" rule, received from the high rules parser 316 at step 406. The high rule condition module 318 comprises an algorithm that is stored on a memory and executed by a processor, and a data storage 320 that stores the high rules conditions and pointers. The memory and/or processor may be the same as processor 312 and memory 314, or may be provided separately. The data storage 320 may instead be part of the data storage 306. The functionality of the high rule condition module 318 is further explained below.

The process of matching the conditions of a high rule to existing rules in the rules repository 306a, and recording pointers to matched rules, is performed whenever a new high rule is specified. In embodiments, this process is also performed whenever a normal rule in the rules repository 306a is expired or changed.

In embodiments, a rule validation module 318a may be provided which checks that the matching of the condition part of the high rules to the content of the rules repository 306a satisfies some criteria. While the rule validation module 318a is shown here as part of the high rules condition module 318, the skilled person would understand that this can also be a separate module that communicates with the high rules condition module 318 and optionally the rule management interface 304. In embodiment, the rule validation module 318a verifies that the high rule specified satisfies at least the condition that one or more matching rules were identified by the high rules condition module 318. In embodiments, the rule validation module 318a checks whether overlapping or contradicting high rules have been created. For example, the rule validation module 318a may identify whether multiple high rules apply to the same or overlapping conditional statements but at least one of these high rules is a "replace" rule. In embodiments, the rule validation module 318a may verify that the condition part of the high rule satisfies a specified maximum level of granularity, i.e. that the condition part specifies criteria that contain a specified minimum level or information. This may help to keep the number of matching rules to a level that is considered appropriate. For example, a high rule condition such as "contains open-door-request" may be considered to be at too high level of granularity whereas a condition such as "contains open-door-request.dayX" where dayX is a specified day of the week may be considered to be of sufficiently low granularity. The rule validation module 318a may send an error or a warning message to the rules management interface 304 directly or via the high rules condition module 318 if one or more of the specified criteria are not satisfied. Instead or in addition to sending an error message, the rule validation module 318a may prevent a high rule from being deployed if one or more of the specified criteria are not satisfied. In embodiments, the rule validation module 318a may produce an error message and/or prevent a high rule from being deployed if its condition part fully overlaps with an existing high rule. In embodiments, the rule validation module 318a may produce a different output when the condition part of a high rule partially overlaps with one or more existing high rules, depending on the logical construction of the partially overlapping high rules. For example, the rule validation module 318a may prevent deployment of a high rule that defines multiple conditions combined with a logical "OR" (i.e. defining alternative conditions) if a high rule with a condition matching any of the multiple alternative conditions of the new rule already exists. However, the rule validation module 318a may not prevent deployment of a high rule that defines multiple conditions combined with a logical "AND" (i.e. defining at least two required conditions) provided that no high rule already exists that has the same combination of required conditions. In such cases, the rule validation module 318a may send a warning/error message to inform the user of the potential conflict.

Figure 5:
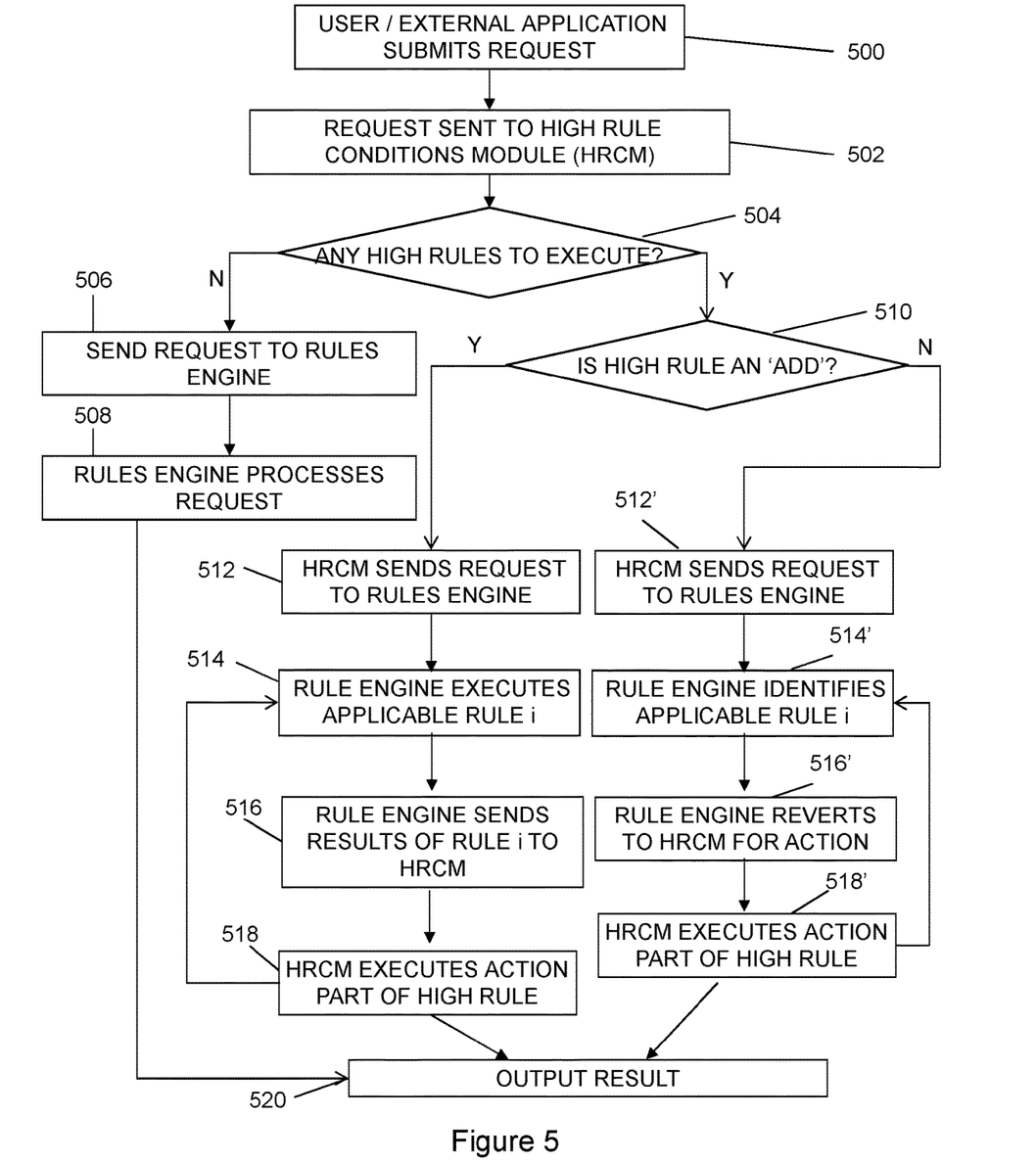
FIG. 5 is a flowchart showing a method of executing rules according to an embodiment of the invention.

FIG. 5 is a flowchart showing a method of executing rules according to an embodiment of the invention. At step 500 an end user or external application submits a request. In this case, requests are not sent directly to the rules engine 302, but are instead sent 502 to the high rule conditions module 316 (HRCM), optionally via a high rule front end (not shown). The HRCM 316 then checks 504 whether any high rules can be executed on the request (i.e. whether the data in the request falls under any of the conditions (IF parts) associated with high rules). If there are no high rules applicable to the request, the high rules conditions module sends 506 the request to the rules engine 302, which processes 508 the request in a conventional way.

However, if there is a high rule that can act on the request, the high rule conditions module 318 checks 510 whether the high rule is an 'add' or a 'replace' high rule. If the high rule is an 'add' rule, the HRCM sends 512 the request to the rules engine. However, instead of executing all of the rules that apply to the request, the rules engine executes 514 each rule $R_m$ that matches the condition to be modified by the high rule (using the pointers recorded by the high rules conditions module 318 at step 410), then sends 516 the result to the HRCM, which executes 518 the action part of the high rule. When all of the rules that apply to the request have been executed by the rules engine and the high rule action part added, the HRCM outputs 520 the result of the rule execution process. If the high rule is a 'replace' rule, the HRCM also sends 512' the request to the rules engine. However, the rules engine then identifies 514' each rule $R_m$ that applies (using the pointers recorded by the high rules conditions module 318 at step 410), but does not execute it the action part of each of these rules. Instead, after each of these rules it contacts 516' the HRCM where the action part of the high rule is executed 518'. When all rules that apply have been identified and the high rules actions executed, the HRCM outputs 520 the result of the rule execution process.

In embodiments, the high rules conditions module 318 may define an order in which high rules are executed when step 504 above identifies that multiple high rules apply to the request. For example, the high rules condition module 318 may execute rules that are logically simple before rules that are logically more complex. In this context, a rule may be considered to be logically simpler (i.e. less complex) when it comprises fewer elements in the conditional statement. For example, a rule such as "contains open-door-request" is logically simpler than a rule such as "contains open-door-request AND contains location=safe".

In embodiments (not shown), step 510 may be omitted and the request sent 512 to the rules engine regardless of whether the high rule is an 'add' or a 'replace' rule. In such embodiments, the rules engine may execute 514 each rule $R_m$ and send the result to the HRCM. At this stage, the HRCM can check whether the high rule is an "add" or a "replace" and execute 518 the action part accordingly.

The present invention will now be illustrated by reference to an access control system, for example a system to control physical access of authorised personnel to a facility. However, the person skilled in the art would understand that the teaching of the invention is applicable to a variety of industries, including, amongst others:

health care and life sciences: clinical decision support, drug interaction assessment, clinical trials data validation, etc.;
  banking: fraud prevention, credit risk decisions, payment fee calculations, cross-sell offer management, etc.;
  insurance: policy underwriting claims processing, risk rating, commission calculations, etc.;
  manufacturing: order configuration validation, order prioritisation, etc.;

public sector: services entitlement and benefits calculations, tax fraud assessment, border control and security screening, etc.;

retail: online recommendations, pricing and tax calculations, loyalty program offer management, etc.

Figure 6:
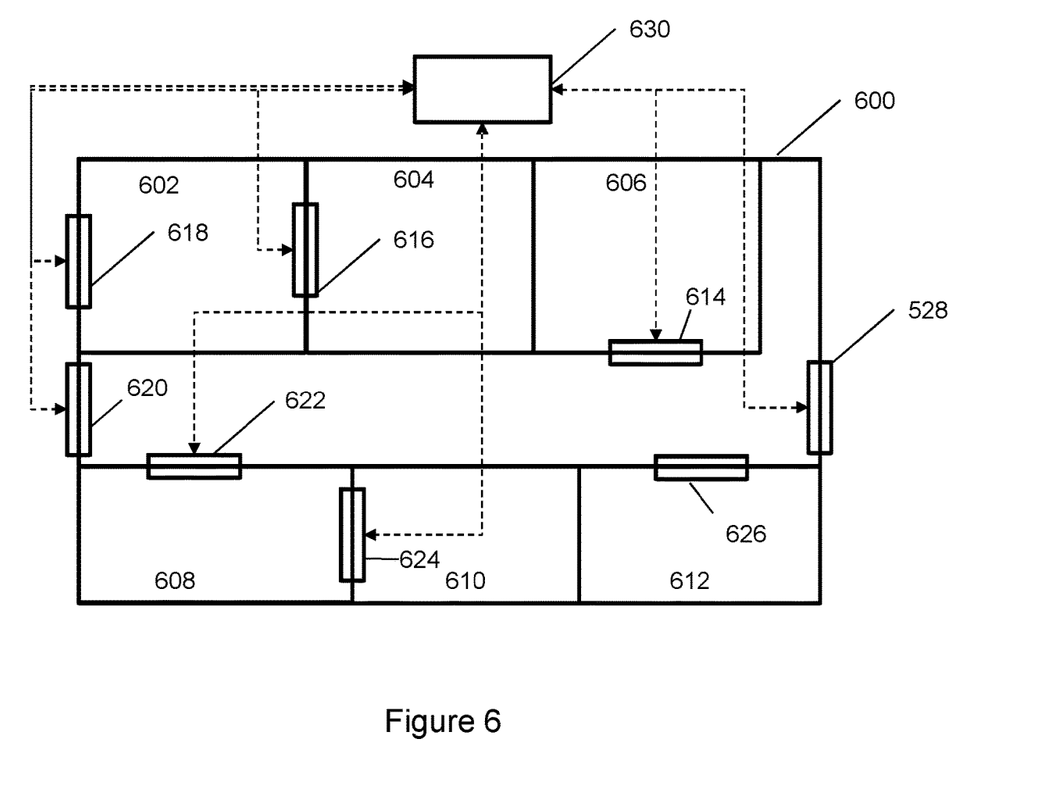
FIG. 6 illustrates an exemplary implementation of an embodiment of the invention applied to an access control system.

FIG. 6 shows an access control system comprising a rule management system according to an embodiment of the invention. An access control system may be installed in a facility with multiple zones and multiple access points. The access control system may comprise one or more locking systems, and each locking system may comprise one or more identification modules. Identification modules may comprise systems using codes, physical keys, identification card, biometrics, human intervention (e.g. intercom), etc., or combinations thereof. In the example on FIG. 6, a facility 600 with multiple zones 602-612 and access points 614-628, is equipped with locking systems (not shown) at some or all access points. The access control system comprises an access rule management system, which communicates with the locking systems (where the locking systems are external applications 110, 310). The access rule management system 630 interfaces with the locking systems to execute a decision logic comprising the following rules:

Rule A:
If open door request and door is internal
then
request card identification
Rule B:
If open door request and time is between 8 pm and 8 am
then
request card identification
Rule C:
If open door request and door is external
then
request access code
Rule D:
If all identification verified
then
open door In particular, a locking system (i.e. external application) may receive data in the form of an "open door request", for example following a person at the door pressing an "open" button associated with the locking system, or a sensor detecting the presence of a person at the door. The locking system may then communicate this data to the access rules management system 630 in order to obtain the appropriate action to be performed. The access rule management system 630 evaluates the data against the rules stored in its database, and decides which rule(s) need to be executed. The access rule management system 630 then outputs the result of the rule execution to the locking system (i.e. in this case the locking system is also the output application), and the locking system may perform the appropriate action (e.g. request identification, or request access code).

Figure 7:
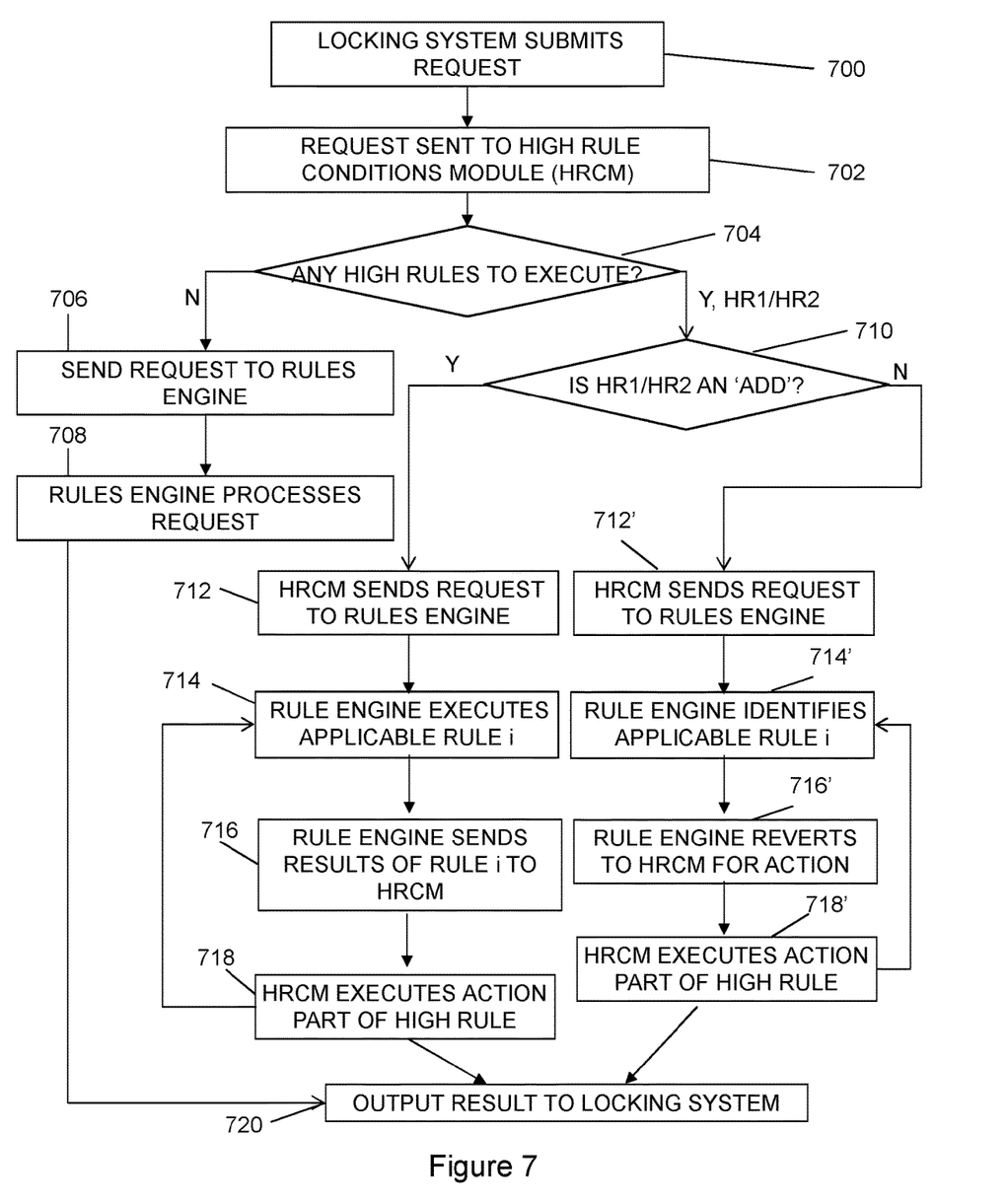
FIG. 7 is a flowchart showing a method of executing rules for an access control system according to an embodiment of the invention.

Suppose a user of the rules management system associated with the access control system needs to implement a new requirement of the access control system, for example that a biometric measurement must be taken before opening any door. Then using the system of the invention, instead of separately changing each of rules A, B and C, the user will be able to write a single rule:

HR1:
In facility y
where mentioned "If open door request"
add
request biometric measurement FIG. 7 is a flowchart showing a method of executing rules for an access control system according to an embodiment of the invention. Whenever an external application, in this case a locking system, sends 700 input data (also referred to as "request") to the rule management system 630 indicating one or more variables, in this case "open door request, door 616, facility y, 5 pm", the data is passed 702 to the high level rule module. The high level rule conditions module of the high level rule module checks 704 whether any high level rule conditions apply to the input data. In this case the high level rule parser would have identified that the conditional statements of rules A, B and C satisfy the required criteria, and there are therefore rules $R_m$ whose behaviour should be modified by HR1. If none of the high level rule conditions apply to the input data, the request is communicated 706 to the rules execution engine which executes 708 the normal rules and produces 720 the output to the output application, in this case the locking system. In this case, HR1 is identified as applicable to the input data, and any rule $R_m$ that is executed should be modified by HR1. The high level rule conditions module checks 710 whether HR1 is tagged as an "add" or a "replace" rule. In this case HR1 is tagged as an "add" high rule. Therefore, the high rules conditions module passes 712 the control (i.e. send the request) to the rule execution engine which identifies a first rule $R_m^1$ (using the pointers recorded by the high rules conditions module 318 at step 410) that is applicable and executes 714 it (e.g. in this case rule A is applicable, if the time had been between 8 pm and 8 am then rule B would also have been applicable), then passes 716 the control back to the high rule conditions module. The high rule condition module then executes 718 the action part of HR1, and passes the control back to the rules execution engine to execute the next identified rule $R_m^2$ that applies to the input data. The action part of HR1 is then executed, and this cycle continues until all rules that are applicable (i.e. all rules where the condition part matches the input data) have been executed. The high rule conditions module then sends 720 the output (i.e. the actions) to the output application, i.e. the locking system. The locking system will then be able to implement the desired action, i.e.: request card identification, request biometric measurement (i.e. Rules A and HR1).

Suppose now that the user of the rules management system associated with the access control system needs to implement a new requirement of the access control system, for example that the biometric measurement be taken before opening any door, and that the biometric measurement is sufficient identification. Then using the system of the invention, instead of separately changing each of rules A, B and C, the user will be able to write a single rule:

HR2:
In facility y
where mentioned "If open door request"
replace
request biometric measurement In this case, the high level rule conditions module of the high level rule module will identify 704 that the conditions of HR2 apply to the input data, and that HR2 is a "replace" rule 710. In this case, the high rule conditions module will pass 712' the control (i.e. send the request) to the rule execution engine but upon each rule match 714' (i.e. for each rule i that the rule engine identifies as applicable using the pointers recorded by the high rules conditions module 318 at step 410), instead of executing the rule, the rule execution engine will pass 716' the control back to the high rule conditions module which will execute 718' the action part of HR2. The cycle continues until all of the rules with a condition that matches the input data have been executed, following which the high rule conditions module communicates 720 the output (i.e. actions) to the output application.

The locking system will then be able to implement the desired action, i.e.: request biometric measurement (i.e. Rule A and HR2).

Although the invention has been described with reference to a number of specific embodiments, the skilled person will appreciate that the invention may be embodied in many other forms.

The invention claimed is:

1. A method of controlling an operational system by a rules management system comprising a processor programmed to execute rules from a rules repository stored on a memory, the method comprising:
providing one or more high level rules comprising a condition part and an effect part, wherein each high level rule, when executed, modifies the effect part of one or more rules Rm in the rules repository;
identifying the one or more rules Rm that match the condition part of each of the one or more high level rules;
verifying the one or more high level rules provided do not overlap with existing high level rules based on one high level rule of the one or more high level rules defining at least two required conditions, wherein no other high level rule of the one or more high level rules includes the at least two required conditions;
detecting, via a sensor, a presence of a person at a door, wherein the door provides access to an access point, of a plurality of access points, that provides access to a zone, of a plurality of zones, in a facility, wherein the door is provided at the access point to the zone in the facility;
receiving, based on the detection of the presence of the person at the door, an open door request for the door;
determining which of the verified one or more high level rules or the one or more rules Rm to execute based on the open door request and the zone corresponding to the door, wherein the verified one or more high level rules and the one or more rules Rm are specific to the zone;
verifying an identity corresponding to the open door request according to the one or more rules Rm and each of the verified one or more high level rules that apply to the open door request for the door, wherein verifying the identity includes:
receiving, by a locking system that includes the sensor, a biometric measurement from the person detected at the door, and
based on the received biometric measurement, verifying, by the locking system, the person detected at the door has access to the zone corresponding to the door; and
operating the locking system to open the door based at least in part on the identity being verified.

2. The method of claim 1, wherein:
the effect part of the high level rule is qualified as an add effect, and
the high level rule modifies the effect part of the one or more rules Rm by combining the effect part of the one or more rules Rm with that of the high level rule.

3. The method of claim 2, further comprising:
executing the rules that apply to the open door request at least by executing each Rm and each high level rule, and
wherein verifying the identity corresponding to the open door request includes at least one of requesting a card identification or requesting an access code.

4. The method of claim 1, wherein:
the effect part of the high level rule is qualified as a replace effect, and
a high level rule modifies the effect part of the one or more rules Rm by replacing the effect part of each of the one or more rules Rm with that of the high level rule.

5. The method of claim 4, wherein executing the rules that apply to the open door request comprises executing the high level rule only for each Rm identified.

6. The method of claim 1, wherein:
providing one or more high level rules comprises a user defining high level rules at a rule management interface,
the one or more criteria indicating the one or more rules Rm in the rules repository is specified by a user of the rules management system; and
the one or more criteria indicating the one or more rules Rm in the rules repository indicate the condition part, to be satisfied, of the one or more high level rules to execute the locking system.

7. The method of claim 6, wherein defining high level rules comprises defining whether an action of the high level rule is to replace or be combined with an action of the one or more rules Rm.

8. The method of claim 6, wherein:
defining the one or more high level rules comprises defining the one or more criteria to identify the one or more rules Rm to modify, and
wherein the one or more rules Rm indicate one or more of a particular time period or a location of the door, and
verifying the identity corresponding to the open door request includes one or more of requesting an access code or an identification, prior to opening the door corresponding to the open door request.

9. The method of claim 1, wherein the at least two required conditions are defined by a logical AND identifier.

10. The method of claim 1, further comprising:
recording a pointer to each rule Rm of the one or more rules Rm that matches the condition part of the one or more high level rules, and
recording whether the effect part of the high level rule is qualified as an add effect or a replace effect.

11. A computing apparatus comprising a processor and a memory, wherein the processor is programmed to execute rules from a rules repository stored on a memory in response to a request, the computing apparatus further comprising:
the rules repository that stores one or more high level rules, wherein each high level rule, when executed by the processor, modifies an effect of execution of one or more rules Rm in the rules repository;
a high rules conditions module that, when executed by the processor:
identifies the one or more high level rules that apply to the request,
verifies the one or more high level rules provided do not overlap with existing high level rules based on one high level rule of the one or more high level rules defining at least two required conditions, wherein no other high level rule of the one or more high level rules includes the at least two required conditions;
receiving, from a sensor, an indication of detecting a presence of a person at a door, wherein the door provides access to an access point, of a plurality of access points, that provides access to a zone, of a plurality of zones, in a facility, wherein the door is provided at the access point to the zone in the facility, receiving, based on the detection of the presence of the person at the door, an open door request for the door, determining which of the verified one or more high level rules or the one or more rules Rm to execute based on the open door request and the zone corresponding to the door, wherein the verified one or more high level rules and the one or more rules Rm are specific to the zone, verifying an identity corresponding to the open door request according to the one or more rules Rm and each of the verified one or more high level rules that apply to the open door request for the door, wherein verifying the identity includes:

receiving, by a locking system that includes the sensor, a biometric measurement from the person detected at the door, and based on the received biometric measurement, verifying, by the locking system, the person detected at the door has access to the zone corresponding to the door, and operating the locking system to open the door based at least in part on the identity being verified.

12. The computing apparatus of claim 11, further comprising a rule management interface configured to allow the user to specify new high rules.

13. The computer apparatus of claim 11, further comprising a high rules parser that, when executed by the processor:

separates a high rule into an action part and a condition part; and sends the action part to the rules repository and the condition part together with a pointer to the action part to the high rules condition module.

14. The computing apparatus of claim 11, further comprising a sanity check module that, when executed by the processor, determines whether a new high level rule satisfies an output the criteria by comparing the new high level rule to existing high rules and rules in the rules repository, wherein the output criteria indicates whether the new high level rule or the existing high level rules have a different output following an addition of the new high level rule.

15. The computing apparatus of claim 14, wherein the sanity check module, when executed by the processor, prevents deployment of the new high level rule that does not satisfy the one or more criteria.

16. A rules management system for executing rules from a rules repository, the system comprising:

a processor;

a sensor configured to detect a presence of a person at a door, wherein the door provides access to an access point, of a plurality of access points, that provides access to a zone, in a plurality of zones, in a facility, wherein the door is provided at the access point to the zone in the facility; and a memory comprising the rules repository and configured to, with the processor, cause the processor to:

provide one or more high level rules comprising a condition part and an effect part, wherein each high level rule, when executed, modifies the effect part of one or more rules Rm in the rules repository, and wherein one or more criteria indicating the one or more rules Rm in the rules repository is specified by a user of the rules management system;

identify the one or more rules Rm that match the condition part of each of the one or more high level rules;

verify the one or more high level rules provided do not overlap with existing high level rules based on one high level rule of the one or more high level rules defining at least two required conditions, wherein no other high level rule of the one or more high level rules includes the at least two required conditions;

receive, based on the sensor detecting the presence of the person at the door, an open door request for the door;

determine which of the verified one or more high level rules or the one or more rules Rm to execute based on the open door request and the zone corresponding to the door, wherein the verified one or more high level rules and the one or more rules Rm are specific to the zone;

verify an identity corresponding to the open door request according to the one or more rules Rm and each of the verified one or more high level rules that apply to the open door request for the door, wherein verifying the identity includes:

receiving, by a locking system that includes the sensor, a biometric measurement from the person detected at the door, and based on the received biometric measurement, verifying, by the locking system, the person detected at the door has access to the zone corresponding to the door, and operate the locking system to open the door based at least in part on the identity being verified.

17. The rules management system of claim 16, wherein:

the effect part of the one or more high level rules is qualified as an add effect, and the one or more high level rules modifies the effect part of the one or more rules Rm by combining the effect part of the one or more rules Rm with that of the one or more high level rules.

18. The rules management system of claim 17, wherein executing the rules that apply to the request comprises executing each Rm and each high level rule.

19. The rules management system of claim 16, wherein:

the effect part of the one or more high level rules is qualified as a replace effect, and a high level rule modifies the effect part of the one or more rules Rm by replacing the effect part of each of the one or more rules Rm with that of the high level rule.

20. The rules management system of claim 19, wherein executing the locking system comprises executing the one or more high level rules only for each rule Rm identified.

* * * * *